(12) United States Patent
Li

(10) Patent No.: US 8,554,073 B2
(45) Date of Patent: Oct. 8, 2013

(54) METHOD AND APPARATUS FOR MIGRATING SUB-NETWORK CONNECTION PROTECTION (SNCP) SERVICE

(75) Inventor: Bin Li, Shenzhen (CN)

(73) Assignee: ZTE Corporation, Guangdong (CN)

( * ) Notice: Subject to any disclaimer, the term of this patent is extended or adjusted under 35 U.S.C. 154(b) by 11 days.

(21) Appl. No.: 13/258,886

(22) PCT Filed: Nov. 18, 2009

(86) PCT No.: PCT/CN2009/075010
§ 371 (c)(1),
(2), (4) Date: Sep. 22, 2011

(87) PCT Pub. No.: WO2011/017861
PCT Pub. Date: Feb. 17, 2011

(65) Prior Publication Data
US 2012/0128353 A1    May 24, 2012

(30) Foreign Application Priority Data

Aug. 10, 2009 (CN) .......................... 2009 1 0161358

(51) Int. Cl.
*H04B 10/00* (2013.01)

(52) U.S. Cl.
USPC ................................................ 398/45; 398/5

(58) Field of Classification Search
USPC ............................................. 398/1–5, 45–57
See application file for complete search history.

(56) References Cited

U.S. PATENT DOCUMENTS

| 7,787,362 | B2 * | 8/2010 | Xu ................................ 370/217 |
| 7,852,863 | B2 * | 12/2010 | Madrahalli et al. ........... 370/401 |
| 7,984,185 | B2 * | 7/2011 | Xu ................................ 709/245 |
| 8,068,483 | B2 * | 11/2011 | Xu ................................ 370/389 |
| 8,144,620 | B2 * | 3/2012 | Xu ................................ 370/254 |
| 2005/0128940 | A1 | 6/2005 | Wen et al. |
| 2006/0245413 | A1 * | 11/2006 | Skalecki et al. .............. 370/351 |

(Continued)

FOREIGN PATENT DOCUMENTS

| CN | 101047440 A | 10/2007 |
| CN | 101047541 A | 10/2007 |
| CN | 101170482 A | 4/2008 |
| CN | 101299893 A | 11/2008 |
| CN | 101321172 A | 12/2008 |
| CN | 101394310 A | 3/2009 |
| EP | 1942604 A1 | 7/2008 |
| RU | 2310279 C2 | 11/2007 |
| WO | 2005060521 A2 | 7/2005 |
| WO | 2009065279 A1 | 5/2009 |

OTHER PUBLICATIONS

English Translation of the International Search Report in International application No. PCT/CN2009/075010, mailed on May 20, 2010.

English Translation of the Written Opinion of the International Search Authority in international application No. PCT/CN2009/075010, mailed on May 20, 2010.

*Primary Examiner* — Agustin Bello
(74) *Attorney, Agent, or Firm* — Cooper Legal Group LLC

(57) ABSTRACT

The present invention discloses a method and an apparatus for migrating a Sub-Network Connection Protection (SNCP) service. The method comprises: receiving a migration request of an SNCP service, wherein the migration request comprises one of: Permanent Connection (PC) to Soft Permanent Connection (SPC) migration, SPC to PC migration; respectively setting cross status control bits of a current operation connection and a correlative connection thereof according to the received migration request, and performing collective migration of the current operation connection and the correlative connection thereof according to the set cross status control bits; respectively modifying the cross status control bits of the current connection and the correlative connection thereof according to the migration result. The consistency of cross management authorities of a working connection and a protection connection of the SNCP service migration can be ensured by the present invention.

10 Claims, 4 Drawing Sheets

(56) References Cited

U.S. PATENT DOCUMENTS

| | | | |
|---|---|---|---|
| 2006/0268944 A1* | 11/2006 | Xu | 370/903 |
| 2008/0034116 A1* | 2/2008 | Li et al. | 709/242 |
| 2008/0117806 A1* | 5/2008 | Xu | 370/217 |
| 2008/0175154 A1* | 7/2008 | Ong et al. | 370/236 |
| 2008/0192626 A1* | 8/2008 | Yang | 370/225 |
| 2008/0273473 A1* | 11/2008 | Xu | 370/255 |
| 2009/0028561 A1* | 1/2009 | Zhang et al. | 398/45 |
| 2009/0073979 A1 | 3/2009 | He | |
| 2009/0122811 A1* | 5/2009 | Wu | 370/468 |
| 2009/0161681 A1* | 6/2009 | Madrahalli et al. | 370/401 |
| 2009/0196198 A1* | 8/2009 | Zhang et al. | 370/252 |
| 2010/0054731 A1* | 3/2010 | Oltman et al. | 398/1 |

* cited by examiner

METHOD AND APPARATUS FOR MIGRATING SUB-NETWORK CONNECTION PROTECTION (SNCP) SERVICE

TECHNICAL FIELD

The present invention relates to the Automatically Switched Optical Network (ASON) technology, especially to a method and an apparatus for migrating a Sub-Network Connection Protection (SNCP) service.

BACKGROUND

The Automatically Switched Optical Network (ASON) is a new technology which is developed based on the traditional optical network, which provides subscriber services with intelligent, flexible and efficient configurations by complete protocol mechanism actions including routing, signaling and automatic discovering, etc.

In the ASON, the following three connections are provided according to different connection requirements and different service request objects: Permanent Connection (PC), Soft Permanent Connection (SPC) and Switched Connection (SC). In the actual is operation and maintenance of the network, the operator needs to perform migration between SPC and PC services within the network as required. When migrating from the PC to the SPC, the signaling status of control plane should be introduced into the PC, and label (referring to Synchronous Digital Hierarchy (SDH) general label provided by Request For Comments (RFC) 3946) and cross management authority are migrated to the control plane. When migrating from the SPC to the PC, the signaling status of Resource Reservation Protocol (RSVP) of the SPC should be deleted, and the label and the cross management authority are migrated to the control plane.

The 1+1 Sub-Network Connection Protection (SNCP) service is a common type of service in the transport network, characterized in providing 1+1 backup for bearer connection of the service, which means that a working connection and a protection connection exist simultaneously. For an ingress node and an egress node, the cross connection follows the principle of received concurrent priority. Therefore, the consistency between the cross management authorities and the working connection label and the protection connection label of the SNCP service should be ensured in both SPC to PC migration and PC to SPC migration during both normal process and abnormal process. In addition, for migrating the SNCP service, a serial mode can be applied, which means that the working connection is migrated first and then the protection connection is migrated after successful migration of the working connection; a parallel mode can also be applied, which means that the working connection and the protection connection are migrated at the same time. In these two modes, the situation that the management authorities of the two connections in the SNCP service are the management plane and the control plane respectively is not permitted during both normal migration and abnormal migration. If the cross management authority of the working connection and the cross management authority of the protection connection are not consistent, the cross with the authority in the management plane cannot be operated in the control plane and the cross with the authority in the control plane cannot is be operated in the management plane, which directly brings the result that the service cannot be deleted in the management plane and operations such as service restoration, optimization, deletion and modification, etc. cannot be performed in the control plane.

Therefore, the problem of authority inconsistency of the cross with protection relationship during the current SNCP service migration influences subsequent service operations.

SUMMARY

The present invention mainly aims to provide a method for migrating a Sub-Network Connection Protection (SNCP) service to ensure the consistency of cross management authorities of a working connection and a protection connection during cross migration of the SNCP service with protection relationship of an ingress node and an egress node.

The present invention further aims to provide an apparatus for migrating an SNCP service to ensure the consistency of cross management authorities of a working connection and a protection connection during cross migration of the SNCP service with protection relationship of an ingress node and an egress node.

In order to solve the aforementioned problems, a method for migrating an SNCP service is provided according to one aspect of the present invention.

A method for migrating an SNCP service, which is used in an Automatically Switched Optical Network (ASON), comprises:

receiving a migration request of an SNCP service; respectively setting cross status control bits of a current operation connection and a correlative connection thereof according to the received migration request, and performing collective migration of the current operation connection and the correlative connection thereof according to the set cross status control bits;

respectively modifying the cross status control bits of the current connection and the correlative connection thereof according to the migration result; and the migration request may comprise: either Permanent Connection (PC) to Soft Permanent Connection (SPC) migration or SPC to PC migration.

The cross status control bit may comprise: a cross setting status bit which is used for determining timing of cross connection migration in the serial mechanism or the parallel mechanism, and an actual cross status bit which is used for identifying the actual status of a current cross.

The value of the cross setting status bit may be cross to-be-migrated, cross setting successful, or cross setting failed; and the value of the actual cross status bit may be sending direction connected, receiving direction connected, both sending direction and receiving direction disconnected, or both sending direction and receiving direction connected.

If the migration request is the PC to SPC migration, the step of performing the collective migration of the current operation connection and the correlative connection thereof according to the set cross status control bits may comprise:

performing the collective migration of the current operation connection and the correlative connection thereof if both the current operation connection and the correlative connection thereof receive the migration request.

If the migration request is the SPC to PC migration, the step of performing the collective migration of the current operation connection and the correlative connection thereof according to the set cross status control bits may comprise:

performing the collective migration of the current operation connection and the correlative connection thereof if either the current operation connection or the correlative connection thereof receives the migration request.

If the current operation connection is a working connection, the correlative connection thereof may be a protection connection; or If the current operation connection is a protection connection, the correlative connection thereof may be a working connection.

An apparatus for migrating a Sub-Network Connection Protection (SNCP) service, comprises:

a receiving module, which is used for receiving a migration request of an SNCP service, wherein the migration request comprises: either Permanent Connection (PC) to Soft Permanent Connection (SPC) migration or SPC to PC migration;

a setting module, which is used for respectively setting cross status control bits of a current operation connection and a correlative connection thereof according to the received migration request;

a performing module, which is used for performing collective migration of the current operation connection and the correlative connection thereof according to the set cross status control bits; and a modifying module, which is used for respectively modifying the cross status control bits of the current connection and the correlative connection thereof according to the migration result.

The cross status control bit set by the setting module and/or modified by the modifying module may comprise: a cross setting status bit and an actual cross status bit, wherein the cross setting status bit may be used for determining timing of cross connection migration in the serial mechanism or the parallel mechanism, and the value of the cross setting status bit may comprise: cross to-be-migrated, cross setting successful, and cross setting failed; and the actual cross status bit may be used for identifying the actual status of a current cross, and the value of the actual cross status bit may comprise: sending direction connected, receiving direction connected, both sending direction and receiving direction disconnected, and both sending direction and receiving direction connected.

The performing module may comprise:

a first performing module, which is used for performing the collective migration of the current operation connection and the correlative connection thereof if the receiving module receives the PC_SPC migration request and both the current operation connection and the correlative connection thereof receive the migration request; and a second performing module, which is used for performing the collective migration of the current operation connection and the correlative connection thereof if the receiving module receives the SPC_PC migration request and either the current operation connection or the correlative connection thereof receives the migration request.

Compared with the prior art, according to the aforementioned technical schemes of the present invention, the timing and specific actions of cross migration can be determined by setting the cross setting status bit and the actual cross status bit, so as to perform one-time cross migration of the SNCP service with protection relationship of the ingress node and the egress node and ensure the consistency of the cross management authorities of the working connection and the protection connection.

DETAILED DESCRIPTION

In order to make the objectives, technical schemes and advantages of the present invention more clear, the present invention will be further explained in details in conjunction with the drawings and embodiments hereinafter.

The main idea of the present invention is to perform one-time migration (possibly when operating a working connection or a protection connection), but not two-time migration when operating the working connection and the protection connection, for the labels and the cross with protection relationship. The present invention sets a cross setting status bit and an actual cross status bit in connection information, so as to determine the timing and specific actions of cross migration according to the cross setting status bit and the actual cross status bit. The present invention is smoothly compatible with two solutions including serial migration and parallel migration, and the present invention can perform one-time cross migration of the SNCP service with protection relationship of the ingress node and the egress node and ensure the consistency of the cross management authorities of the working connection and the protection connection.

Figure 1:
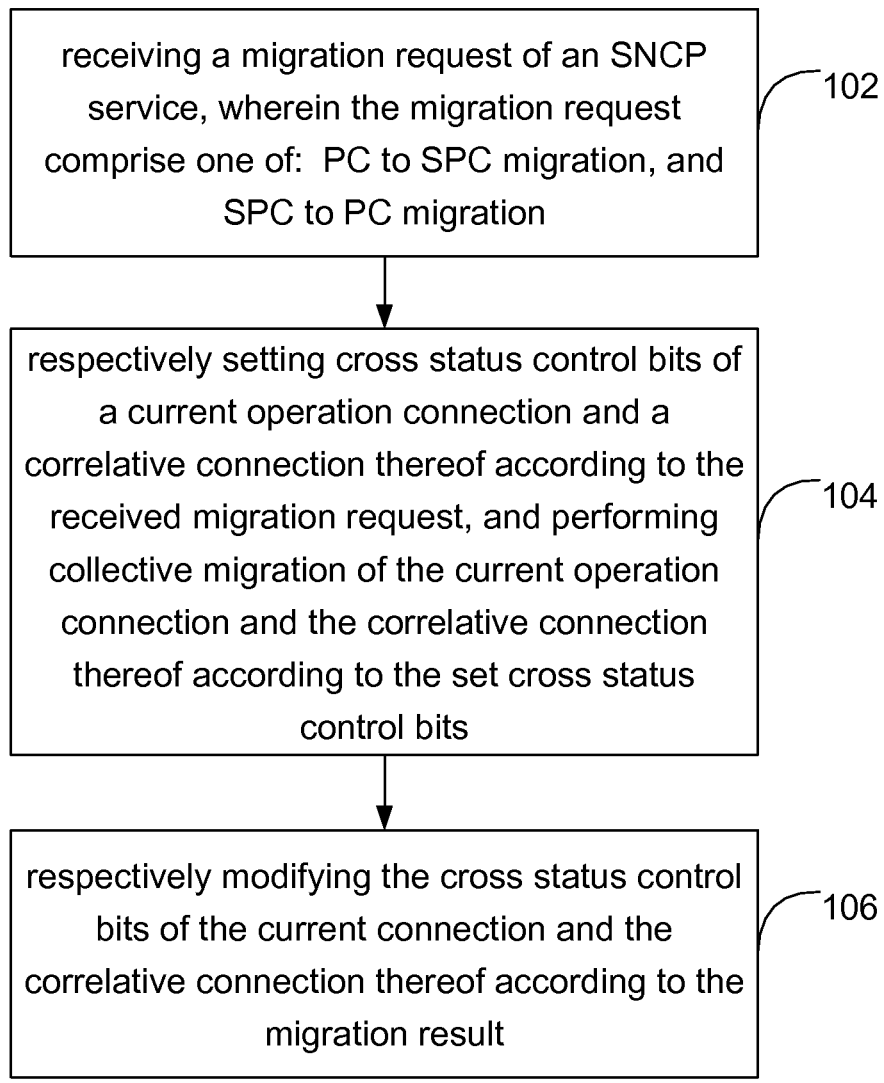
FIG. 1 shows a flowchart of a method for migrating an SNCP service according to one embodiment of the present invention.

According to the embodiments of the present invention, a method for migrating an SNCP service is provided. The method can be used in an Automatically Switched Optical Network (ASON). FIG. 1 shows a flowchart of a method for migrating an SNCP service according to one embodiment of the present invention. As shown in FIG. 1, the method of the present invention comprises:

Step 102: receiving a migration request of an SNCP service, wherein the migration request comprises one of: PC to SPC migration, and SPC to PC migration.

Step 104: respectively setting cross status control bits of a current operation connection and a correlative connection thereof according to the received migration request, and performing collective migration of the current operation connection and the correlative connection thereof according to the set cross status control bits.

This step specifically comprises: if the migration request is the PC to SPC migration and both the current operation connection and the correlative connection thereof receive the migration request, then performing the collective migration of the current operation connection and the correlative connection thereof; and if the migration request is the SPC to PC migration and either the current operation connection or the correlative connection thereof receives the migration request, then performing the collective migration of the current operation connection and the correlative connection thereof.

Wherein the cross status control bit comprises: a cross setting status bit and an actual cross status bit, wherein the cross setting status bit is used for determining timing of cross connection migration in the serial migration mechanism or the parallel migration mechanism, and the value of the cross setting status bit comprises: cross to-be-migrated, cross setting successful, and cross setting failed; the actual cross status bit is used for identifying the actual status of a current cross, and the value of the actual cross status bit comprises: sending direction connected, receiving direction connected, both sending direction and receiving direction disconnected, and both sending direction and receiving direction connected.

Step 106: respectively modifying the cross status control bits of the current connection and the correlative connection thereof according to the migration result.

Wherein if the current operation connection is a working connection, the correlative connection thereof is a protection connection; or if the current operation connection is a protection connection, the correlative connection thereof is a working connection.

Compared with the prior art, according to the aforementioned technical schemes of the present invention, the timing and actions of cross migration can be determined by the cross setting status bit and the actual cross status bit, so as to perform one-time cross migration of the SNCP service with protection relationship of the ingress node and the egress node and ensure the consistency of the cross management authorities of the working connection and the protection connection.

The present invention will be further explained in conjunction with the drawings and embodiments hereinafter.

The present invention is used for migration between PC and SPC in the ASON network (PC to SPC migration, hereinafter shortened as PC_SPC migration, SPC to PC migration, hereinafter shortened as SPC_PC migration). Due to reasons like network faults, etc., the signaling flow of performing PC_SPC migration is not unique, and RSVP-TE (or CR-LDP is also suitable) is taken as an example. Currently, there are two main signaling protocols to realize connection management: Constraint-based Routed Label Distribution Protocol (CR-LDP) and Resource Reservation Protocol Traffic Engineering (RSVP-TE). The main signaling scenes of the migration between PC and SPC of the SNCP service will be listed. For SPC_PC migration, the signaling flow of graceful deletion of RSVP-TE is used, but graceful deletion is not the only solution. In order to simplify the rollback in a failure process, generally, Resv is used for setting the cross mode for PC_SPC migration, which indicates that the node performs the migration of the cross connection after receiving the Resv signaling. Therefore, the PC_SPC migration involved in the embodiments of the present invention is described by taking that the cross is set by using Resv as an example, but not limited to the cross setting mode.

All embodiments of the present invention refer to the bidirectional SNCP service. Since the ingress node and the egress node of the bidirectional SNCP service have the same protection relationship, the embodiments of the present invention are described by taking an egress node as an example hereinafter. It needs to be explained that A is an ingress node, B and C are intermediate nodes, and D is an egress node from FIG. 2 to FIG. 5.

Embodiment 1 is a normal flow of PC_SPC migration based on the parallel mechanism.

Figure 2:
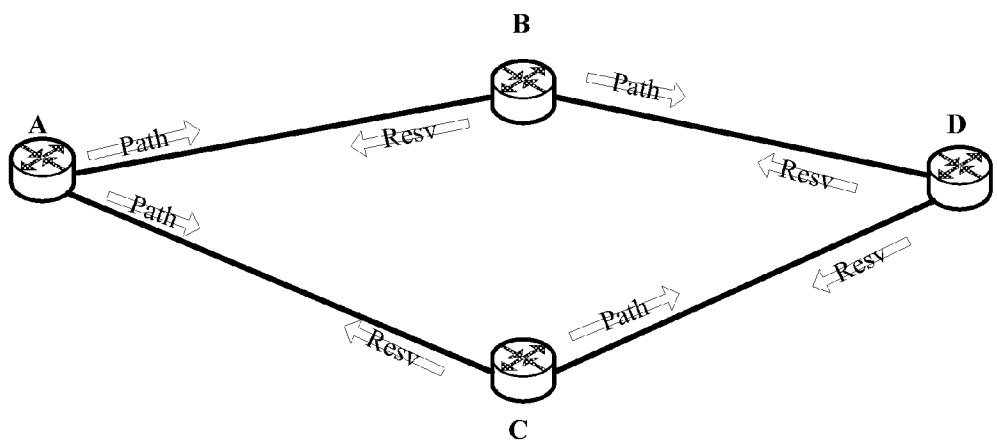
FIG. 2 shows a normal Resource Reservation Protocol Traffic Engineering (RSVP-TE) signaling diagram of PC to SPC migration based on the parallel mechanism according to one embodiment of the present invention.

FIG. 2 shows a normal RSVP-TE signaling diagram of PC_SPC migration based on the parallel mechanism according to one embodiment of the present invention. As shown in FIG. 2, the normal signaling flow of the PC_SPC migration is consistent with the connection establishment flow described in Internet Engineering Task Force (IETF) RFC3473. FIG. 2 describes the PC_SPC migration of the SNCP service based on the parallel mechanism. The parallel mechanism means that the ingress node sends a Path signaling of the working connection and a Path signaling of the protection connection in parallel and the egress node cannot determine whether the Path signaling of the working connection or the Path signaling of the protection connection arrives first. Therefore, cross migration is performed to the connection of which the migration request arrives later. This embodiment takes that the Path signaling of the protection connection arrives first as an example to make further explanation.

First, the egress node receives the Path signaling of the protection connection, which indicates the arrival of the PC_SPC migration request from the upstream node.

Subsequently, a local protection connection control block is established according to the PC_SPC migration request from the upstream node, and the cross setting status bit of the protection connection control block is in an initialized state, namely, cross setting successful, and the value of the actual cross status bit is both sending direction and receiving direction connected. Searching of working connection control block is failed, because the Path signaling of the working connection has not arrived at the egress node at the moment and the connection control block is not established yet. In this case, the egress node believes that the migration request of the protection connection is received first. Therefore, the cross setting status bit of the protection connection is set in the state of cross to-be-migrated, the cross connection migration is not performed, the Resv signaling of the protection connection is directly returned to the upstream node and the PC_SPC migration of the protection connection is completed.

Subsequently, the egress node receives the Path signaling of the working connection and the local working connection control block is established. The cross status bit of the protection connection is checked at the moment, and since the cross setting status bit of the protection connection is cross to-be-migrated, the egress node believes that the migration request of the protection connection arrives earlier than the migration request of the working connection. Therefore, the working connection performs both sending direction and the receiving direction cross migration of the working connection and the protection connection, and the authority is migrated from the management plane to the control plane.

Subsequently, after the cross migration success request is received, the value of the cross setting status bits of the working connection and the protection connection are modified into cross setting successful. The actual cross statuses of the working connection and the protection connection are modified into both sending direction and receiving direction connected.

Finally, the egress node returns the Resv signaling of the working connection to the upstream node, and the PC_SPC migration of the working connection and the protection connection of the SNCP service of the egress node is completed.

Through this embodiment, rollback of the cross connection migration is reduced. During the specific implementation process, the treatment of the situation that the Path signaling of the working connection arrives at the egress node first is similar to that of the aforementioned treatment. Therefore, it is unnecessary to go into details here.

Embodiment 2 is a normal flow of SPC_PC migration based on the parallel mechanism.

Figure 3:
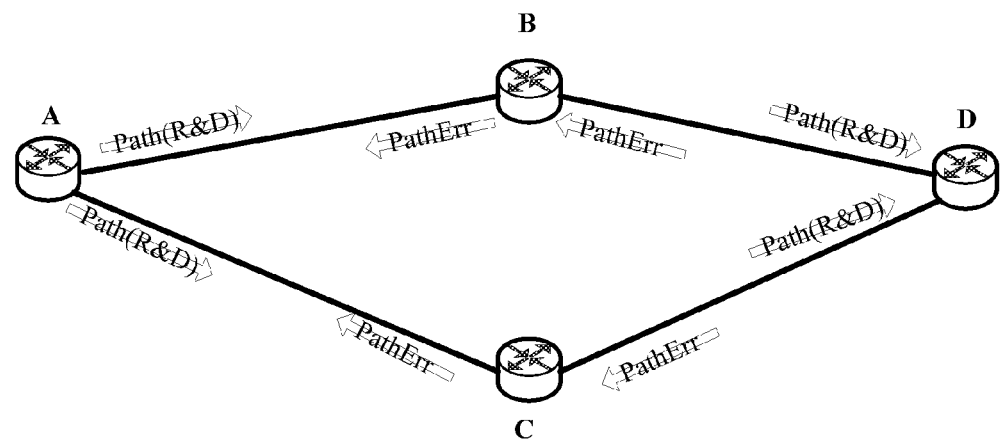
FIG. 3 shows a normal RSVP-TE signaling diagram of SPC to PC migration based on the parallel mechanism according to one embodiment of the present invention.

FIG. 3 shows a normal RSVP-TE signaling diagram of SPC_PC migration based on the parallel mechanism according to one embodiment of the present invention. As shown in FIG. 3, the normal signaling flow of the SPC_PC migration is consistent with the connection establishment flow described in IETF RFC3473. FIG. 3 describes the SPC_PC migration of the SNCP service based on the parallel mechanism. The parallel mechanism means that the ingress node sends a Path (R&D) signaling of the working connection and a Path (R&D) signaling of the protection connection in parallel and the egress node cannot determine whether the Path signaling of the working connection or the Path signaling of the protection connection arrives first, and cross migration is performed to the connection of which the migration request arrives first. The situation that the Path (R&D) signaling of the working connection arrives first is taken as an example to give further description here.

First, the egress node receives the Path (R&D) signaling of the working connection, which indicates the arrival of the SPC_PC migration request from the upstream node.

Subsequently, the egress node performs both sending direction and the receiving direction cross migration of the working connection and the protection connection (migration from the control plane to the management plane) and modifies the values of the cross setting status bits of the working connection and the protection connection into cross setting successful. The actual cross statuses of the working connection and the protection connection are modified into both sending direction and receiving direction disconnected. The egress node returns a PathErr signaling of the working connection.

Subsequently, after the arrival of the Path (R&D) signaling of the protection connection, the cross setting status bit and the actual cross status bit of the protection connection control block are checked. At the moment, the cross setting status bit of the protection connection is cross setting successful, and the actual cross status is both sending direction and receiving direction disconnected (modified in step 302). Therefore, the migration of the SPC_PC migration connection of the protection connection cross is not performed.

Finally, the egress node returns a PathErr signaling of the protection connection, and the SPC_PC migration of the SNCP connection of the egress node is completed.

Through this embodiment, the cross migration with protection relationship of the ingress node and the egress node is rapidly completed. During the specific implementation process, the treatment of the situation that the Path (R&D) signaling of the protection connection arrives at the egress node first is similar to that of the aforementioned treatment. Therefore, it is unnecessary to go into details here.

Embodiment 3 is a cross migration failure of the ingress node of the PC_SPC migration based on the serial mechanism.

Figure 4:
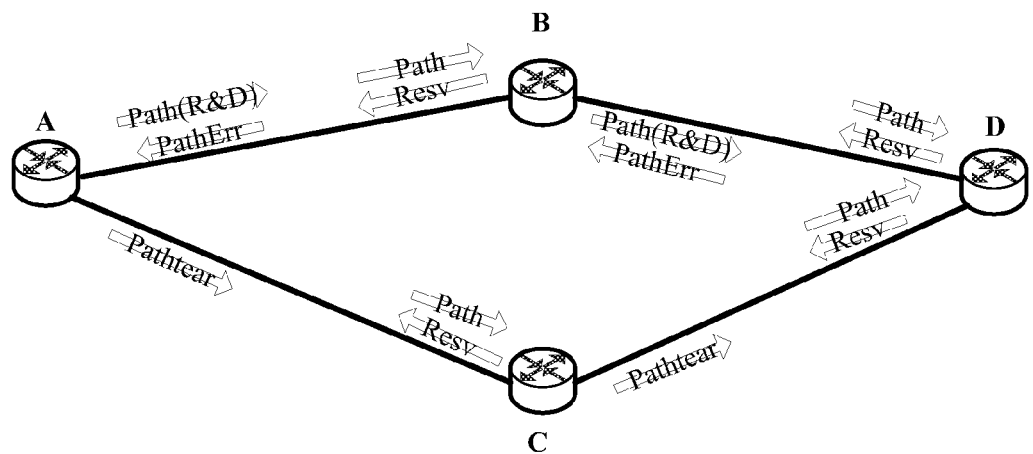
FIG. 4 shows an RSVP-TE signal diagram of a cross migration failure of an ingress node of PC to SPC migration based on the serial mechanism according one embodiment of the present invention.
Figure 5:
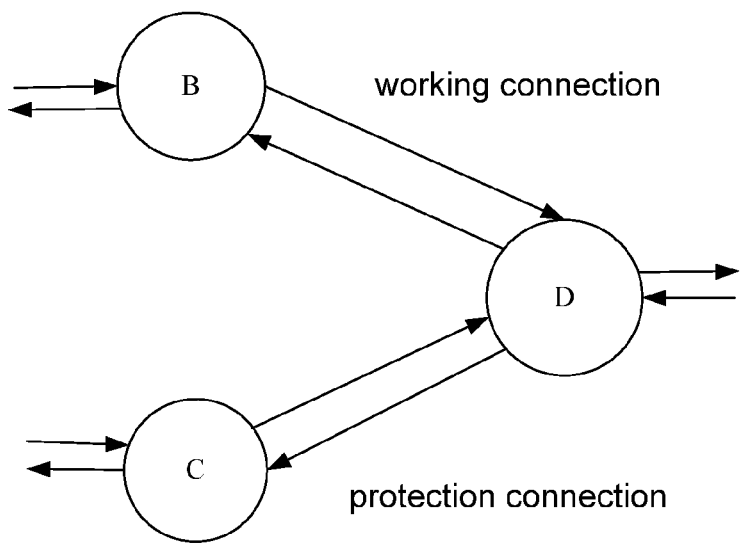
FIG. 5 shows a connection schematic diagram of an egress node according to one embodiment of the present invention.

FIG. 4 shows an RSVP-TE signal diagram of a cross migration failure of an ingress node of PC_SPC migration based on the serial mechanism according to one embodiment of the present invention. FIG. 4 describes the PC_SPC migration of the SNCP service based on the serial mechanism which means that the ingress node sends athe Path signaling of the working connection to perform the PC_SPC migration of the working connection first, and sends the Path signaling of the protection connection to perform the PC_SPC migration of the protection connection after successful migration of the working connection. During the migration process of the protection connection, the cross migration of the ingress node is failed. Therefore, the SPC_PC migration will be performed to perform rollback to the egress node of which the PC_SPC migration has been successful. The migration of the working connection of the ingress node is successful, thus the ingress node will automatically send down the SPC_PC migration of the working connection to perform rollback. As stated above, the SPC_PC migration uses the graceful deletion signaling flow of RSVP-TE, which means that the ingress node has to send a Path (R&D) signaling to the downstream. For the protection connection, the cross setting of the ingress node is failed, therefore, the ingress node will sends a Pathtear deletion signaling to perform signaling status deletion. The egress node will perform cross migration to the connection of which the migration request arrives first, since it cannot determine whether the Path (R&D) signaling of the working connection or the Pathtear signaling of the protection connection arrives first. Here, the situation that the Path (R&D) signaling of the working connection arrives first is taken as an example.

First, the egress node receives the Path signaling of the working connection, which indicates the arrival of the PC_SPC migration request from the upstream node. The PC_SPC migration request of the working connection arrives first, as stated in embodiment 1; the egress node will not perform cross migration at the moment and directly returns the Resv signaling of the working connection to the upstream node. The PC_SPC migration of the working connection is completed. The egress node receives the Path signaling of the protection connection, as stated in embodiment 1, and performs the both sending direction and receiving direction cross migration of the working connection and the protection connection at the moment. After the cross migration success request is received, the cross setting status bits of the working connection and the protection connection are modified to be cross setting successful and the actual cross statuses of the working connection and the protection connection are modified to be both sending direction and receiving direction connected. The egress node returns the Resv signaling of the protection connection and completes the PC_SPC migration of the working connection and the protection connection of the SNCP service.

Subsequently, the ingress node performs the PC_SPC cross migration failure after receiving the Resv signaling of the protection connection. At the moment, the SPC_PC migration of the working connection will be initiated to perform rollback. The ingress node sends the Path (R&D) signaling to the downstream node to perform rollback of the working connection. In addition, because the failure to cross migration of the protection connection after receiving the Resv signaling, the Pathtear signaling will be sent to the downstream to perform rollback of the protection connection.

Subsequently, the egress node receives the Path (R&D) signaling of the working connection and checks that the cross setting status bit of the working connection is cross setting successful and that the actual cross status bit of the working connection is both sending direction and receiving direction connected (set in step 404). At the moment, the SPC_PC migration of the working connection and the SPC_PC migration of the protection connection are performed collectively. The cross setting status bits of the working connection and the protection connection are modified to be cross setting successful. The actual cross status bits of the working connection and the protection connection are modified to be both sending direction and receiving direction disconnected. The egress node returns the PathErr signaling of the working connection to the upstream node.

Subsequently, the egress node receives the Pathtear signaling of the protection connection and checks that the cross setting status bit of the protection connection is cross setting successful and that the actual cross status bit is both sending direction and receiving direction disconnected. Therefore, the migration of the SPC_PC migration connection of the protection connection cross will not be performed.

Finally, the egress node completes the rollback of the SPC_PC migration of the working connection and the SPC_PC migration of the protection connection of the SNCP service.

During the specific implementation process, the treatment of the situation that the Pathtear signaling of the protection connection arrives at the egress node first is similar to that of the aforementioned treatment. Therefore, it is unnecessary to go into details here.

The aforementioned embodiments 1-3 give description by taking the egress node as an example, which does not limit the embodiments of the present invention. The treatment process by taking the ingress node as an example is similar to the treatment of embodiments 1-3 and it is unnecessary to go into details here. In addition, the treatment process of embodiments 1-3 can be understood in conjunction with FIG. 5 which shows a connection schematic diagram of the egress node according to one embodiment of the present invention.

According to the embodiments of the present invention, an apparatus for migrating an SNCP service is further provided. The apparatus can be used for realizing the method for migrating an SNCP service provided by the embodiments of the aforementioned method.

Figure 6:
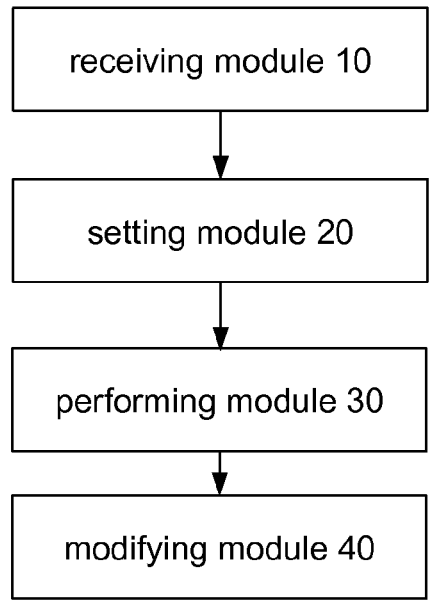
FIG. 6 shows a block diagram of an apparatus for migrating an SNCP service according to one embodiment of the present invention.
Figure 7:
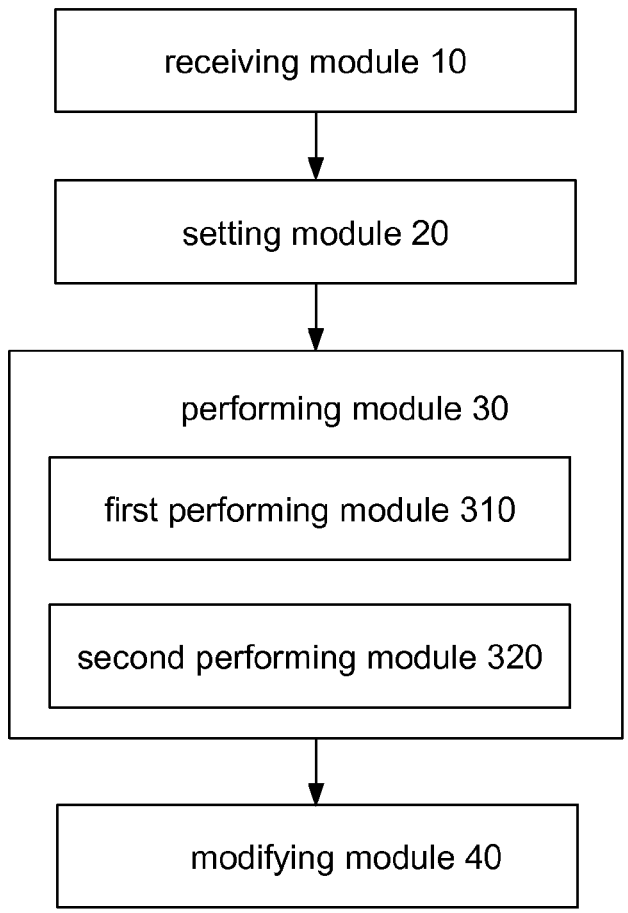
FIG. 7 shows a block diagram of an optimal structure of an apparatus for migrating an SNCP service according to one embodiment of the present invention.

FIG. 6 shows a block diagram of an apparatus for migrating an SNCP service according to one embodiment of the present invention. FIG. 7 shows a block diagram of an optimal structure of an apparatus for migrating an SNCP service according to one embodiment of the present invention.

As shown in FIG. 6, the apparatus for migrating an SNCP service according to the present invention comprises: a receiving module 10, a setting module 20, a performing module 30 and a modifying module 40. The detailed structure of the apparatus is is described in conjunction with the drawings hereinafter.

The receiving module 10 is used for receiving a migration request of an SNCP service, wherein the migration request comprises one of: PC_SPC migration, and SPC_PC migration.

The setting module 20, connected with the receiving module 10, is used for respectively setting cross status control bits of a current operation connection and a correlative connection thereof according to the migration request received by the receiving module 10.

The performing module 30, connected with the setting module 20, is used for performing collective migration of the current operation connection and the correlative connection thereof according to the cross status control bits set by the setting module 20, wherein the cross status control bit comprises: a cross setting status bit and an actual cross status bit. The cross setting status bit is used for determining timing of cross connection migration in the serial mechanism or the parallel mechanism, and the value of the cross setting status bit comprises: cross to-be-migrated, cross setting successful, and cross setting failed; the actual cross status bit is used for identifying the actual status of a current cross, and the value of the actual cross status bit comprises: sending direction connected, receiving direction connected, both sending direction and receiving direction disconnected, and both sending direction and receiving direction connected.

The modifying module 40, connected with the performing module 30, is used for respectively modifying the cross status control bits of the current connection and the correlative connection thereof according to the migration result performed by the performing module 30.

As shown in FIG. 7 and based on the structure shown in FIG. 6, preferably, the performing module 30 further comprises: a first performing module 310, which is used for performing the collective migration of the current operation connection and the correlative connection thereof if the receiving module 10 receives the PC_SPC migration request and both the current operation connection and the correlative connection thereof receive the migration request; a second performing module 320, which is used for performing the collective migration of the current operation connection and the correlative connection thereof if the receiving module 10 receives the SPC_PC migration request and either the current operation connection or the correlative connection thereof receives the migration request.

During the treatment process, if the current operation connection is the working connection, the correlative connection thereof is the protection connection; or if the current operation connection is the protection connection, the correlative connection thereof is the working connection.

During the specific implementation process, the specific work flow of the apparatus for migrating an SNCP service provided by the embodiments of the present invention can refer to FIG. 1-FIG. 5. Therefore, it is unnecessary to go into details here.

In conclusion, according to the aforementioned technical schemes of the present invention and compared with the prior art, the present invention is smoothly compatible with two solutions including serial migration and parallel migration of the SNCP service. The timing and actions of cross migration can be determined by the cross setting status bit and the actual cross status bit in the connection information, so as to perform one-time cross migration of the SNCP service with protection relationship of the ingress node and the egress node for both PC_SPC migration and SPC_PC migration in both normal process and abnormal process, and ensure the consistency of the cross management authorities of the working connection and the protection connection.

What are described above are only preferred embodiments of the present invention and are not used for limiting the present invention, and for those skilled in the art, there may be various modifications and changes to the present invention. Any modification, equivalent replacement and improvement made within the spirit and principle of the present invention should be included in the scope of the claims of the present invention.

What is claimed is:

1. A method for migrating a Sub-Network Connection Protection (SNCP) service, which is used in an Automatically Switched Optical Network (ASON), comprising:
  receiving a migration request of an SNCP service; respectively setting cross status control bits of a current operation connection and a correlative connection thereof according to the received migration request, and performing collective migration of the current operation connection and the correlative connection thereof according to the set cross status control bits; and
  respectively modifying the cross status control bits of the current operation connection and the correlative connection thereof according to a migration result,
  wherein the migration request comprises either a Permanent Connection (PC) to Soft Permanent Connection (SPC) migration request or a SPC to PC migration request, and
  wherein the cross status control bits comprise:
    a cross setting status bit which is used for determining timing of cross connection migration in a serial mechanism or a parallel mechanism, and an actual cross status bit which is used for identifying an actual status of a current cross.

2. The method according to claim 1, wherein:
a value of the cross setting status bit is cross to-be-migrated, cross setting successful, or cross setting failed; and
a value of the actual cross status bit is sending direction connected, receiving direction connected, both sending direction and receiving direction disconnected, or both sending direction and receiving direction connected.

3. The method according to claim 1, wherein, if the migration request comprises the PC to SPC migration request, the performing a collective migration of the current operation connection and the correlative connection thereof according to the set cross status control bits comprises:
performing the collective migration of the current operation connection and the correlative connection thereof if both the current operation connection and the correlative connection thereof receive the migration request.

4. The method according to claim 1, wherein, if the migration request comprises the SPC to PC migration request, the performing a collective migration of the current operation connection and the correlative connection thereof according to the set cross status control bits comprises:
performing the collective migration of the current operation connection and the correlative connection thereof if either the current operation connection or the correlative connection thereof receives the migration request.

5. The method according to claim 1, wherein:
if the current operation connection is a working connection, the correlative connection thereof is a protection connection; or
if the current operation connection is a protection connection, the correlative connection thereof is a working connection.

6. An apparatus for migrating a Sub-Network Connection Protection (SNCP) service, comprising:
a receiving module, which is used for receiving a migration request of an SNCP service, wherein the migration request comprises either a Permanent Connection (PC) to Soft Permanent Connection (SPC) migration request or a SPC to PC migration request;
a setting module, which is used for respectively setting cross status control bits of a current operation connection and a correlative connection thereof according to the received migration request;
a performing module, which is used for performing collective migration of the current operation connection and the correlative connection thereof according to the set cross status control bits; and
a modifying module, which is used for respectively modifying the cross status control bits of the current operation connection and the correlative connection thereof according to a migration result,
wherein the cross status control bits set by the setting module and/or modified by the modifying module comprise:
a cross setting status bit used for determining timing of cross connection migration in a serial mechanism or a parallel mechanism, wherein a value of the cross setting status bit is cross to-be-migrated, cross setting successful, or cross setting failed; and
an actual cross status bit used for identifying an actual status of a current cross, wherein a value of the actual cross status bit is sending direction connected, receiving direction connected, both sending direction and receiving direction disconnected, or both sending direction and receiving direction connected.

7. The apparatus according to claim 6, wherein the performing module comprises:
a first performing module, which is used for performing the collective migration of the current operation connection and the correlative connection thereof if the receiving module receives the PC to SPC migration request and both the current operation connection and the correlative connection thereof receive the migration request; and
a second performing module, which is used for performing the collective migration of the current operation connection and the correlative connection thereof if the receiving module receives the SPC to PC migration request and either the current operation connection or the correlative connection thereof receives the migration request.

8. The method according to claim 2, wherein:
if the current operation connection is a working connection, the correlative connection thereof is a protection connection; or
if the current operation connection is a protection connection, the correlative connection thereof is a working connection.

9. The method according to claim 3, wherein:
if the current operation connection is a working connection, the correlative connection thereof is a protection connection; or
if the current operation connection is a protection connection, the correlative connection thereof is a working connection.

10. The method according to claim 4, wherein:
if the current operation connection is a working connection, the correlative connection thereof is a protection connection; or
if the current operation connection is a protection connection, the correlative connection thereof is a working connection.

* * * * *